(12) United States Patent
Imanishi et al.

(10) Patent No.: US 8,441,536 B2
(45) Date of Patent: May 14, 2013

(54) VEHICLE PERIPHERY DISPLAYING APPARATUS

(75) Inventors: Masayuki Imanishi, Okazaki (JP); Nobuhiko Wakayama, Nagoya (JP)

(73) Assignees: Denso Corporation, Kariya (JP); Nippon Soken, Inc., Kariya (JP)

( * ) Notice: Subject to any disclaimer, the term of this patent is extended or adjusted under 35 U.S.C. 154(b) by 332 days.

(21) Appl. No.: 12/658,559

(22) Filed: Feb. 11, 2010

(65) Prior Publication Data

US 2010/0201818 A1     Aug. 12, 2010

(30) Foreign Application Priority Data

Feb. 12, 2009   (JP) ................................ 2009-030268

(51) Int. Cl.
*H04N 7/18* (2006.01)
(52) U.S. Cl.
USPC .......................................... 348/148; 348/143
(58) Field of Classification Search .................. 348/143, 348/148
See application file for complete search history.

(56) References Cited

U.S. PATENT DOCUMENTS

| 2004/0102897 A1* | 5/2004 | Watanabe et al. ............. 701/208 |
| 2005/0249379 A1* | 11/2005 | Yoshimura ..................... 382/104 |
| 2006/0187238 A1* | 8/2006 | Yoneji ............................ 345/629 |
| 2009/0079585 A1* | 3/2009 | Chinomi et al. .............. 340/901 |

FOREIGN PATENT DOCUMENTS

| JP | 2000-079860 | 3/2000 |
| JP | 2002-262281 | 9/2002 |
| JP | 2002-354467 | 12/2002 |
| JP | 2003-189291 | 7/2003 |
| JP | 2003-212041 | 7/2003 |
| JP | 2006-035995 | 2/2006 |
| JP | 2006-321394 | 11/2006 |
| JP | 2006-327498 | 12/2006 |
| JP | 2007-062649 | 3/2007 |

OTHER PUBLICATIONS

Office Action mailed on Dec. 14, 2010, in the corresponding Japanese Application No. 2009-030268.

* cited by examiner

*Primary Examiner* — Umar Cheema
(74) *Attorney, Agent, or Firm* — Harness, Dickey & Pierce, PLC (57) ABSTRACT

A vehicle periphery displaying apparatus for a vehicle is disclosed. The apparatus includes: an imaging device for capturing a periphery image; a storage medium for storing history data comprising one of the periphery image and information on an object-in-periphery, the storage medium prestoring a vehicle image; a display screen having a real-time displaying part for displaying thereon the periphery image with distortion of the periphery image being uncorrected, and a history displaying part for displaying thereon the vehicle image and a history image being produced based on the history data; and a drawing section configured to superimposingly draw the vehicle image and the history image provided with the distortion that the periphery image has, such that the object-in-periphery shown in the history image is continuously connected to that shown in the periphery image.

21 Claims, 7 Drawing Sheets

VEHICLE PERIPHERY DISPLAYING APPARATUS

CROSS REFERENCE TO RELATED APPLICATION

The present application is based on Japanese Patent Application No. 2009-30268 filed on Feb. 12, 2009, disclosure of which is incorporated herein by reference.

BACKGROUND OF THE INVENTION

1. Field of the Invention

The present invention relates to a vehicle periphery displaying apparatus for displaying a vehicle periphery situation.

2. Description of Related Art

There is known a technique of displaying a vehicle periphery image synthesized from two images: one is an image captured by a camera to show a situation of a vehicle periphery in real-time; and the other is a synthetic image, which is synthesized from an image of the vehicle and an image that covers an area currently located outside a field of view of the camera due to backward movement of the vehicle. Such technique is described in JP-2003-189291A and JP-2006-327498A for instance.

According to a technique described in JP-2003-189291A, data of an image captured by a camera is converted by being projected onto a ground coordinate system, and thereby a bird's eye view image taken from a predetermined viewpoint (corresponding to location of the camera) is successively produced. Because of the above process, an image to be displayed is different from a raw image with characteristic distortion. A first bird's eye view image produced based on previous shot of the camera is displaced in accordance with movement of the vehicle to produce a post-displacement bird's eye view image. A synthetic bird's eye view image is synthesized from the post-displacement bird's eye view image and a second bird's eye view image produced based on the newly shot of the camera. Further, the synthetic bird's eye view image is converted into a projection image, so that the projection image looks like an image captured by a camera. The projection image is displayed with a monitor.

According to a technique described in JP-2006-327498A, a drawing processer corrects for the distortion, which results from a wide angle lens, of a presently-captured image and a previously-captured image, so that the corrected images have no distortion. From the corrected previously-captured image, the drawing processer extracts only the data representative of an area close to the vehicle, thereby producing data of a past image for image synthesizing. Further, the past image is converted into an image taken from a virtual view point that is located above a center of a rear axel of the vehicle.

From the corrected presently-captured image, the drawing processer extracts only the data representative of an area distant from the vehicle, thereby producing data of a current image for image synthesizing. Further, the drawing processer performs size reduction on the data of the current image at a predetermined reduction rate to produce the reduced data. The drawing processer superimpose the reduced data of the current image on a synthetic area of the data of the past image whose viewpoint has been converted, thereby producing a synthetic image and displaying the synthetic image on a display screen. Further, the drawing processer coverts a vehicle width extension line and a rear tire line in accordance with the virtual viewpoint and displays the converted, vehicle width extension line and the converted rear tire line on the display screen.

The inventors of the present application have found that the above-described conventional techniques involve the following difficulties. Since the above-described conventional techniques perform a variety of image processing (e.g., correction of distortion, viewpoint conversion, size reduction and the like) on an image captured by a camera, a large amount of data is involved in the computation, and a microcomputer is required to have a large computational power. Further, since the conventional technique corrects an image captured by a camera and displays the image without distortion, the displayed image without distortion may be easily viewable on a screen but an area covered by the displayed image becomes disadvantageously small.

SUMMARY OF THE INVENTION

In view of the above, it is an objective of the present invention to provide a vehicle periphery displaying apparatus capable of ensuring vehicle periphery visibility and reducing computation for vehicle periphery image production.

According to an aspect of the present invention, a vehicle periphery displaying apparatus for a vehicle is provided. The vehicle periphery apparatus includes an imaging device, a storage medium, a display screen and a drawing section. The imaging device is configured to capture a periphery image, which shows a periphery of the vehicle and an object-in-periphery. The object-in-periphery is located in the periphery of the vehicle. The object-in-periphery includes at least one of an road-surface mark and an on-road object. The storage medium is configured to store history data comprising at least one of the periphery image and information on the object-in-periphery. The information on the object-in-periphery is extracted from the periphery image or acquired from a sensor equipped in the vehicle. A vehicle image representative of the vehicle is pre-stored in the storage medium. The display screen has: a real-time displaying part for displaying thereon the periphery image that shows a present situation of the periphery of the vehicle, with distortion of the periphery image being uncorrected; and a history displaying part for displaying thereon the vehicle image and a history image, the history image being produced based on the history data. The history displaying part adjoins the real-time displaying part. The drawing section is configured to superimposingly draw the vehicle image and the history image each taken from a predetermined view point on the history displaying part of the display screen, such that: the vehicle image and the history image are provided with the distortion that the periphery image has; and the object-in-periphery shown in the history image is continuously connected to that shown in the periphery image.

According to the above vehicle periphery displaying apparatus, since the periphery image with the uncorrected distortion is displayed on the real-time displaying part, an area covered by the periphery image becomes larger than that covered by an image whose distortion is corrected. It is therefore possible to provide a driver to much more information on the periphery of the vehicle. Further, since the object-in-periphery displayed on the history displaying part is provided with the distortion that the periphery image has, and since the object-in-periphery displayed on the history displaying part is continuously connected to that shown in the real-time displaying part, it is possible to provide visual presentation by visually combining (i) the periphery image on the real-time displaying part (e.g., a raw image) showing the present situation of the periphery and (ii) the history image on the history displaying part showing an area presently located outside of a field of view of the imaging device. It is therefore possible to ensure visibility of the periphery of the vehicle and reduce computation for image production. In the above, the object-in-periphery may be a mark or object in the periphery of the vehicle, such as a ditch, a step, curb, a pedestrian, another vehicle, a parking line (e.g., white line indicating a parking space) or the like.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

The exemplary embodiments will be described below with reference to the accompanying drawings. In the following description, like reference numerals refer to like parts.

First Embodiment

A vehicle periphery displaying apparatus according to embodiments of the present invention can display a vehicle periphery situation on a display screen and enables a vehicle driver to view the display screen, thereby assisting driving of the vehicle driver. In a first embodiment, a vehicle rear displaying apparatus will be described below as an example of the vehicle periphery displaying apparatus.

The vehicle rear displaying apparatus can display a circumstance around a rear part of a vehicle on a display screen and enable a driver to view the display screen, thereby assisting backward movement of the vehicle in parking. On the display screen, the vehicle rear displaying apparatus can display a synthetic image synthesized from (i) an actual image that shows the present situation behind the vehicle and (ii) an image that is produced based on data of image captured in the past to show the vehicle and a periphery of the vehicle, so that the actual image of the present situation behind the vehicle is continuously connected to the image of the vehicle and the periphery of the vehicle. The vehicle rear displaying apparatus of the present embodiment can provide efficient assistance in vehicle backward movement for parking, by informing precise position of the vehicle to the driver.

Figure 1:
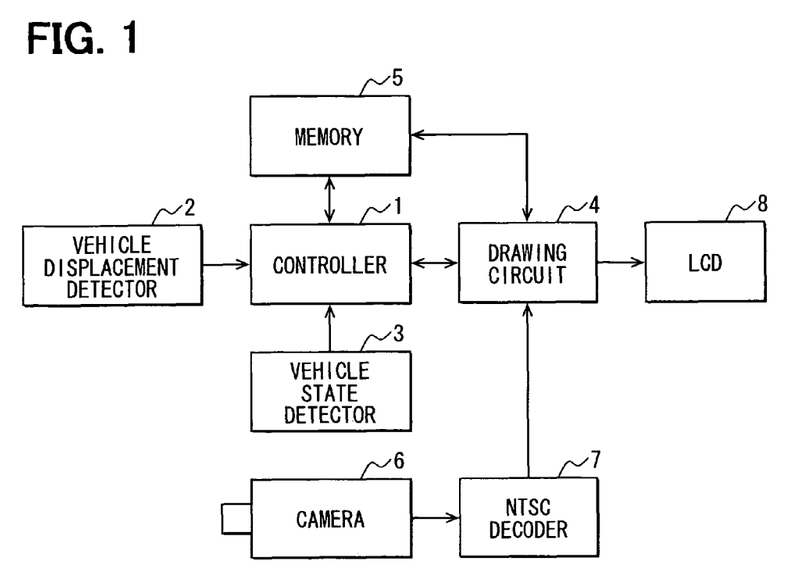
FIG. 1 is a diagram illustrating a schematic configuration of a vehicle rear displaying apparatus.

As shown in FIG. 1, the vehicle rear displaying apparatus includes: a camera 6 for capturing an image of a rearward of a vehicle (i.e., an area behind the vehicle); a display screen 8 for displaying thereon an image captured by the camera 6; a drawing circuit 4 for drawing the image to be displayed on the display screen 8; a NTSC (National Television System Committee) decoder 7 for converting an analog signal from the camera 6 into a digital signal, and for outputting the digital signal to the drawing circuit 4; a memory 5 for storing therein data of images captured by the camera 6; a microcomputer 1 for controlling display on the display screen 8; a vehicle displacement detector 2; and a vehicle state detector 3.

Figure 2:
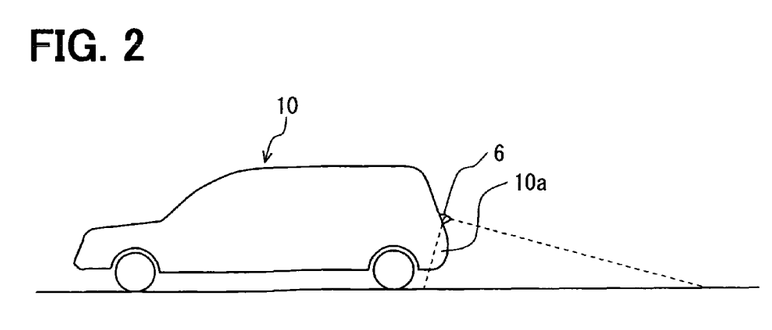
FIG. 2 is a diagram illustrating a positional relationship between a vehicle and a camera.

As shown in FIG. 2, the camera 6 is mounted above a rear bumper 10a of a vehicle 10. A filed of view of the camera 6 in the rearward of the vehicle can be described as a predetermined distance and a predetermined angle of view (e.g., 180 degrees in the rearward of the vehicle). The camera 6 captures a rearward image covering a wide area in the rearward of the vehicle, and can act as an imaging device or means. The memory 5 stores an image signal from the NTSC decoder 7 as image data. Data of images captured by the camera 6 in the past is stored in the memory 5 as history data. A rear part image showing a rear part of the vehicle 10 is pre-stored in the memory 5. The rear part image is an image that is to be drawn so as to have a precise positional relationship to the captured rearward image. The rear part image pre-stored in the memory 5 includes an image of the rear bumper 10a of the vehicle 10 and the like. As an example of the rear part image, the present embodiment uses an image that is created as computer graphic and taken from a predetermined view point. The rear part image created as computer graphic is also referred to as a vehicle CG. The predetermined view point is set to a position above the vehicle 10. Data is transmittable between the memory 5 and the microcomputer 1 and between the memory 5 and the drawing circuit 4. The memory 5 can act as a storage medium.

The display screen 8 displays the rearward image when a gear shifter for a transmission of the vehicle 10 is in a reverse position (R). When the vehicle 10 moves backward, a rearward image displaying part 20 (which is an example of a periphery image displaying part) and a history displaying part 30 adjacent to each other are set on the display screen 8. On the rearward image displaying part 20, the rearward image captured by the camera 6 is displayed in real-time with distortion of the rearward image being uncorrected. On the history displaying part 30, an image produced based on the history data is displayed.

The display screen 8 may be a liquid crystal display (LCD) screen. The display screen 8 may be arranged forward of a steering wheel or arranged on a part of an instrumental panel, which is located at a center part of a dashboard. Alternatively, the display screen 8 may be located at a part of the dashboard, the part being relatively closer to a windshield than another part of the dashboard. According this alternative configuration, a driver can visually recognize the rearward image while looking to a front of the vehicle, without looking to an area that is just in front of the driver and nearby the steering wheel. Alternatively, the display screen 8 may be arranged in a stand position at a vehicle-width-direction center of the dashboard, or may be a LCD screen of a car navigation apparatus.

The vehicle displacement detector 2 detects movement distance of the vehicle 10 with respect to a certain state of the vehicle 10 based on the number of revolutions of tire or the like, and further detects a rotation direction of the vehicle 10 during the movement based on a steering angle or the like, thereby detecting displacement of the vehicle 10. A signal indicative of the detected displacement is outputted to the microcomputer 1 from the vehicle displacement detector 2. Alternatively, the displacement, which includes the movement distance and the rotation angle, may be acquired through image conversion. The image conversion may include converting the images showing the present position and the past position of the vehicle into bird's eye view images, and matching the bird eye view images by computation. The vehicle state detector 3 receives detection signals indicative of a variety of states of the vehicle 10. In the present embodiment, the vehicle state detector 3 has at least a function to receive a signal indicative of position of the gear shifter and output the signal to the microcomputer 1.

The drawing circuit 4 can act as a drawing section or means for outputting an image to be displayed to the display device 8. The drawing circuit 4 is communicatable with the microcomputer 1. The drawing circuit 4 outputs a raw image of the rearward of the vehicle captured by the camera 6 and causes the display screen 8 to display the raw image on the rearward image displaying part 20. Further, on the history displaying part 30, the drawing circuit 4 superimposingly draws an image of an object-in-periphery and the vehicle CG each taken from the predetermined viewpoint, and outputs the object-in-periphery and the vehicle CG to the display device 8. The object-in-periphery is an on-road object or a road-surface mark. The on-road object may be detected by an ultrasonic sonar of the vehicle 10 or the like, and is for example another vehicle (i.e., a vehicle other than the vehicle 10), a wall or a pedestrian. The road-surface mark is, for example, a blockage such as a ditch, a bump, a step, a curb and the like, or a parking line drawn as a white line to indicate a parking space. The road-surface mark may be placed in an area which the vehicle 10 is expected to move in by backward movement. The road-surface mark can act as a mark in a periphery of the vehicle. It may be preferable to display at least one of position of axel 11 of the vehicle 10 and a tire wheel 12 on the history displaying part 30.

The drawing circuit 4 draws images to be displayed on the history displaying part 30 such that: the images are provided with the distortion that the rearward image on the rearward image displaying part 20 has; the object-in-periphery shown in the history displaying part 30 is continuously connected to that shown in the rearward image on the rearward image displaying part 20.

The microcomputer 1 can act as a controller. The microcomputer 1 receives a signal from the vehicle displacement detector 2 or the vehicle state detector 3, performs predetermined computation, and outputs image data to the drawing circuit 4 based on a result of the computation. The microcomputer 1 includes a ROM (read-only-memory) and a RAM (random-access-memory). The ROM stores a program for computation and the like. The RAM acts a working space for computation.

Various methods can be employed as a method for detecting an on-road object or a road-surface mark using the history data. As one example, explanation is given below on a method for detecting a white line acting as a parking line, which is an example of the road-surface mark. The memory stores therein the history data comprising the rearward image that is captured in the past during the movement of the vehicle 10. From the memory 5 storing the history data, the microcomputer 1 reads a variation in brightness in the rearward image, and plots the variation on a virtual two-dimensional coordinate system that is set on a window, thereby detecting the presence of the white line on the window.

More specifically, a Y axis coordinate value on the two dimensional coordinate system is fixed at a certain value, and a brightness variation of the image is extracted by changing only X axis coordinate value. Thereby, a brightness distribution obtained through the change in X axis coordinate value is acquired. The brightness distribution obtained through the change in X axis coordinate value has a larger brightness at a part corresponding to the white line than other parts. This is because a road surface is displayed in darker color (e.g., black color like asphalt color) on the rearward image than the white line acting as the road-surface mark. The part having a larger brightness than its surroundings is extracted so that the extracted part is continuous and has a length corresponding to a width of the white line in the X axis direction.

Figure 6:
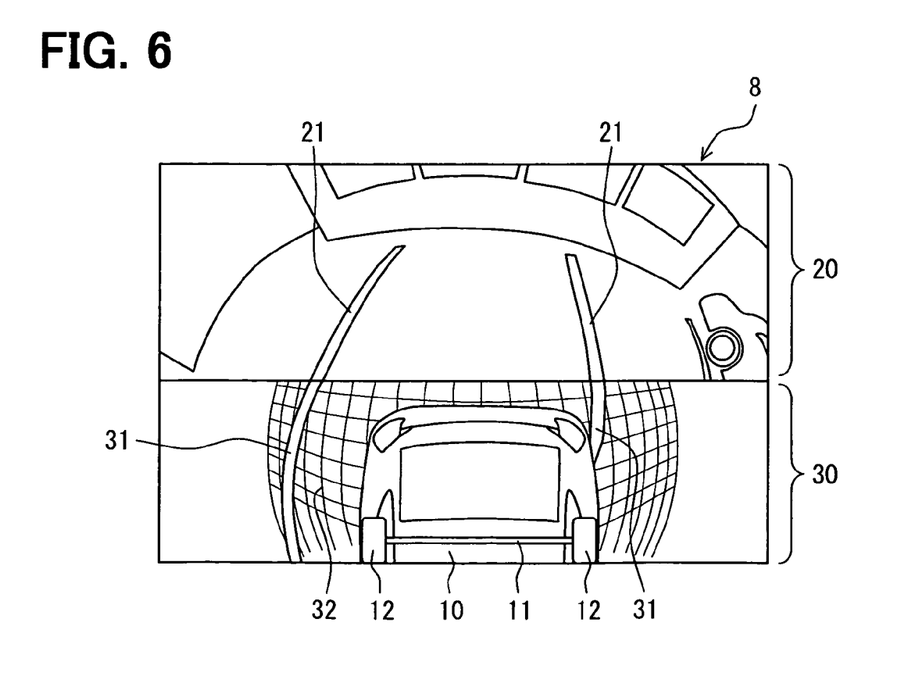
FIG. 6 is a diagram illustrating a window that is displayed when the gear shifter is in the reverse position in accordance with the first embodiment.

Using the above-described way, multiple brightness distributions each obtained through the change in the X axis coordinate value are extracted and produced by changing Y axis coordinate value. As the number of Y axis coordinate values for extracting bright distribution increases, the extracted parts having a larger brightness can form a shape more similar to the actual white line on the image. However, in one embodiment, as shown in FIG. 6, it may be enough to draw a white line 31 on the history displaying part 30 so that the white line 31 is continuously connected to a white line on the rearward image displaying part 20. Thus, the number of brightness distributions to be extracted and plotted can be much smaller than that is required to form the white line as a continuous line.

As seen from the above, the microcomputer 1 performs white line detection through recognizing a white line on an image not as "line" but as "multiple points plotted". It is thus possible to remarkably reduce an amount of data involved in data processing, and a working area for data processing, and time for the data processing. Since the vehicle rear displaying apparatus of the present embodiment employs the above described way to detect a white line and since it is possible to reduce required memory size and required computation power, the vehicle rear displaying apparatus may not requires a high-computation-power controller like, for example, a controller of a car navigation apparatus. For example, a controller for controlling an instrumental panel can sufficiently act as the controller of the vehicle rear displaying apparatus.

Alternatively, the white line detection may be performed such that, from the brightness distribution on the two dimensional coordinate system, only a part corresponding to a edge of the white line 21 is extracted, and coordinates of the edge is recorded. According to this manner, it is possible to further reduce an amount of data involved in the processing, the working area for processing and the time required for the processing.

Figure 3:
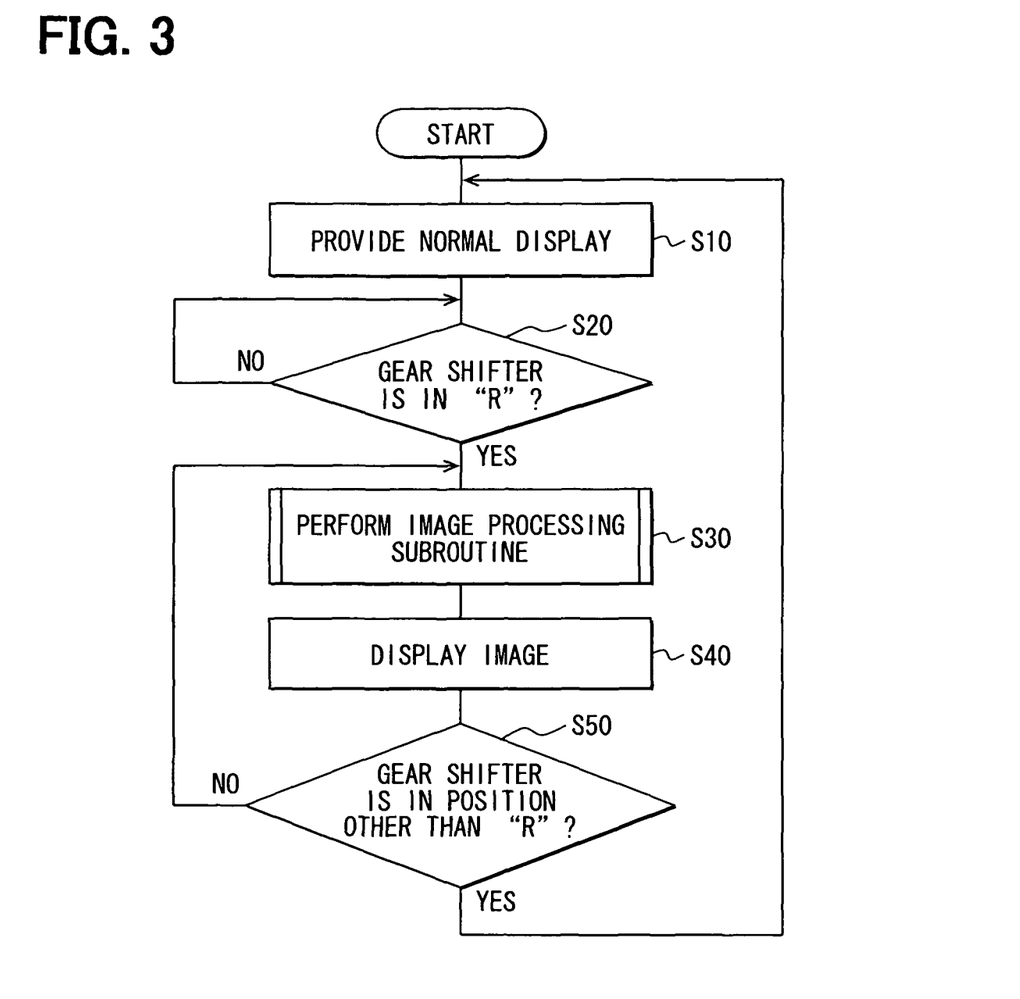
FIG. 3 is a main flowchart illustrating a drive assist operation of the vehicle rear displaying apparatus in accordance with a first embodiment.
Figure 4:
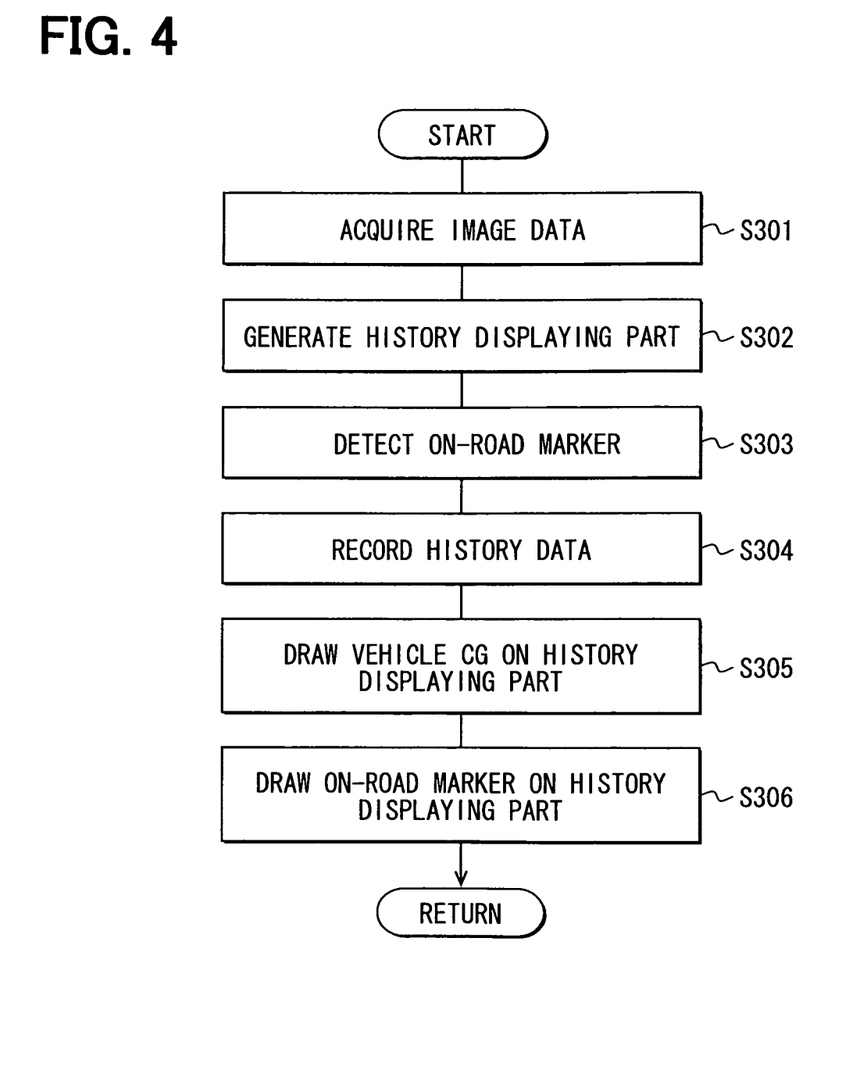
FIG. 4 is a flowchart illustrating an image processing subroutine.

When a vehicle backs in a parking space, the vehicle rear displaying apparatus performs a drive assist operation illustrated in FIGS. 3 and 4. The drive assist operation is explained below with reference to FIGS. 3 and 4. It should be noted that processes in the flowcharts in FIGS. 3 and 4 can be performed by or via the microcomputer 1, which acts as a controller for controlling operation of the vehicle rear displaying apparatus.

In response to the power-on of the microcomputer 1, the microcomputer 1 starts performing processes of a main flowchart illustrated in FIG. 3. At S10, an image for normal operation is displayed on the display screen 8. The image for normal operation is different from an image for a vehicle back assist operation. At S20, the microcomputer 1 determines whether the vehicle state detector 3 receives a signal indicating that the gear shifter of the vehicle 10 is in the reverse (R)

position. The microcomputer 1 cyclically performs S20 until the vehicle state detector 3 receives a signal indicating that the gear shifter of the vehicle 10 is in "R". When it is determined that the vehicle state detector 3 receives a signal indicating that the gear shifter of the vehicle 10 is in "R", corresponding to YES at S20, the process proceeds to S30. At S30, the microcomputer 1 performs an image processing subroutine for producing an image to be outputted to the display screen 8. In the image processing subroutine, the drawing circuit 4 draws an image at S301 to S306 of the image processing subroutine and outputs the image to the display screen 8. After the image processing subroutine, the process proceeds to S40. At S40, the microcomputer 1 displays a window containing the rearward image displaying part 20 and the history displaying part 30.

At S50, the microcomputer 1 determines whether the vehicle state detector 3 receives a signal indicating that the gear shifter of the vehicle 10 is in a position other than "R". When it is determined at S50 that the vehicle state detector 3 receives a signal indicating that the gear shifter of the vehicle 10 is not in a position other than "R", corresponding to "NO" at S50, the process returns to S30. In this case, the images are successively captured, drawn and displayed through S30 and S40 after the microcomputer 1 recognizes at S20 that the gear shifter is in "R". Until it is determined that the gear shifter is in a position other than "R", the microcomputer 1 keeps displaying the image on the rearward image displaying part 20 and the image on the history displaying part 30, which are continuously connected to each other. In the above, the image on the rearward image displaying part 20 shows the present situation of the rearward of the vehicle 10 in real-time. When it is determined that the gear shifter is in a position other than "R", corresponding to "YES" at S50, the process returns to S10 to finish displaying the images for vehicle back assistance operation. When the ignition switch of the vehicle 10 is turned into OFF because the parking is completed, the drive assist operation illustrated as the main flowchart of FIG. 3 is ended in response to the power-off of the microcomputer 1.

Figure 5:
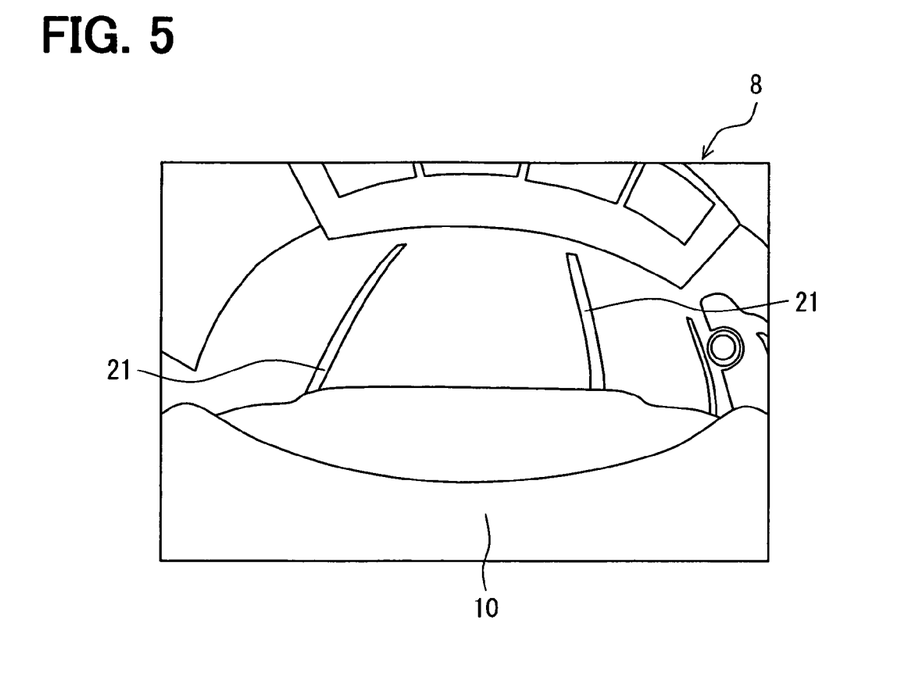
FIG. 5 is a diagram illustrating a raw image displayed on an entire window, the raw image being captured by a camera.

The image processing subroutine will be illustrated below with reference to FIG. 4. At S301, the camera 6 acquires data of the rearward image, which is captured so as to cover an area containing a predetermined part of the vehicle 10. Then, a signal representative of the rearward image captured by the camera 6 is inputted to the memory 5 and the microcomputer 1 via the NTSC decoder 7 and the drawing circuit 4. In the above, data of an image that is projected onto a virtual coordinate system on a window is recorded and accumulated in the memory 5 in relation to movement of the vehicle 10. Although the acquired data of the image may not be actually displayed on the display screen 8, an image illustrated in FIG. 5 would be displayed if drawn on the display screen 8. The image in FIG. 5 is such that the rearward image is on an upper half of the displays screen and a rear part of the vehicle 10 is on a lower half of the display screen. FIG. 5 illustrates a case in which a raw image captured by the camera 6 is displayed full-screen.

At S302, the drawing circuit 4 performs a process of producing the history displaying part 30 and the rearward image displaying part 20, and arranges the parts 20, 30 on a window. As shown in FIG. 6, the rearward image displaying part 20 is arranged at an upper part of the window, and the history displaying part 30 is arranged at a lower part of the window so as to adjoin the rearward image displaying part 20. FIG. 6 is a diagram illustrating a window to be displayed when a vehicle moves backward to park. At S303, the microcomputer 1 reads the data of image transferred to the memory 5, and detects the road-surface mark and the like (which is assumed to be a white line acting as a parking line in this example) using the above-described, white line detection method or the like. The white line 21 is detected in the form of multiple plots projected onto the virtual coordinate system on the window. At S304, the white line 21 projected onto the virtual coordinate system is transferred to the memory 5 and recorded as the history data in the memory 5 by the microcomputer 1.

At S305, the drawing circuit 4 reads the vehicle CG pre-stored in the memory 5, and draws the vehicle CG taken from the predetermined viewpoint on the history displaying part 30 produced at S302. In the above drawing, the drawing circuit 4 provides the vehicle CG with the same distortion as the raw image on the rearward image displaying part 20 has. It should be noted that the drawing circuit 4 daringly distorts the vehicle CG and draws the distorted vehicle CG.

At S306, the drawing circuit 4 reads the white line 21 (which acts as the road-surface mark) recorded in the memory 5, and draws a white line 31 taken from the predetermined viewpoint on the history displaying part 30 produced at S302. In the above drawing, the drawing circuit 4 performs a known viewpoint conversion operation to covert viewpoint of the white line 31 into the same viewpoint as that of the vehicle CG. Further, the drawing circuit 4 provides the white line 31 with the same distortion as the raw image on the rearward image displaying part 20 has. It should be noted that the drawing circuit 4 daringly distorts the white line 21 and draw the distorted white line 21 as is the case for the vehicle CG.

For example, the following process can be used as a process at S305 and S306 for providing distortion to an image. First, a correction process for removing distortion of an image s performed on data of am image captured by the camera 6 in the past. Then, the data of an image is converted into data in a three dimensional coordinate systems. In accordance with vehicle movement, the data in the three dimensional coordinate systems is transformed by rotation, translation and the like based on a signal associated with the vehicle movement (e.g., an amount of displacement, rotation and the like). Then, the data of image converted into a three dimension coordinate system is projected onto a virtual coordinate system on window, and thereby a two dimension image is produced. A process for providing distortion to the two dimension image is performed. Through the above manners, the vehicle CG and the white line 31 each having the same distortion as the raw image has can be drawn on the history displaying part 30.

At S40, a process of synthesizing a synthetic image from an image for the rearward image displaying part 20 and an image for the history displaying part 30 is performed, and the images for the two parts 20 and 30 are outputted to and displayed on the display screen 8 as the synthetic image. In the above, the image for the rearward image displaying part 20 is the rearward image illustrated in, for example, an upper part of FIGS. 6 and 7. The image for the history displaying part 30 is the images drawn at S305 and S306.

Through the above image processing subroutine, the white line 21 of the raw image on the rearward image displaying part 20 and the white line 31 on the history displaying part 30 are displayed so as to be continuously connected to each other at a boundary between the two parts 20, 30, as shown in FIG. 6. In the above, the white line 31 is drawn so that the white line 31 and the white line 21 have the substantially same width and color at the boundary, and the white lines 21 and 31 match each other. In other words, the white line 31, which is presently located outside the filed of view of the camera 6, and the white line 21, which is presently located inside the filed of view of the camera 6, are integrally displayed on the display screen 8. Through the above manners, the past image can contain a mark (e.g., the white line 31), so that the mark is informative for a driver to precisely recognize the position of the vehicle 10. Further, it is possible to visually provide a driver with the past image and the present image as one synthesized image while the boundary between the past image and the present image is distinctively displayed. The present embodiment therefore enables a driver to clearly and precisely comprehend a positional relationship among a vehicle body, a road-surface mark in a periphery of the vehicle body, and the present situation of a rearward of the vehicle body.

Further, the drawing circuit 4 may draw an expected travel path line, a vehicle width extension line, and the like so that such lines are superimposed on the image for the rearward image displaying part 20. The expected travel path line is an indicator that predicts a travel path of a backing based on a vehicle width and a steering angle. The vehicle width extension line is an indicator that predicts location of sides of the backing vehicle. The predicated travel path and the extended vehicle with line are drawn in different color and are easily discriminable for a driver.

Figure 7:
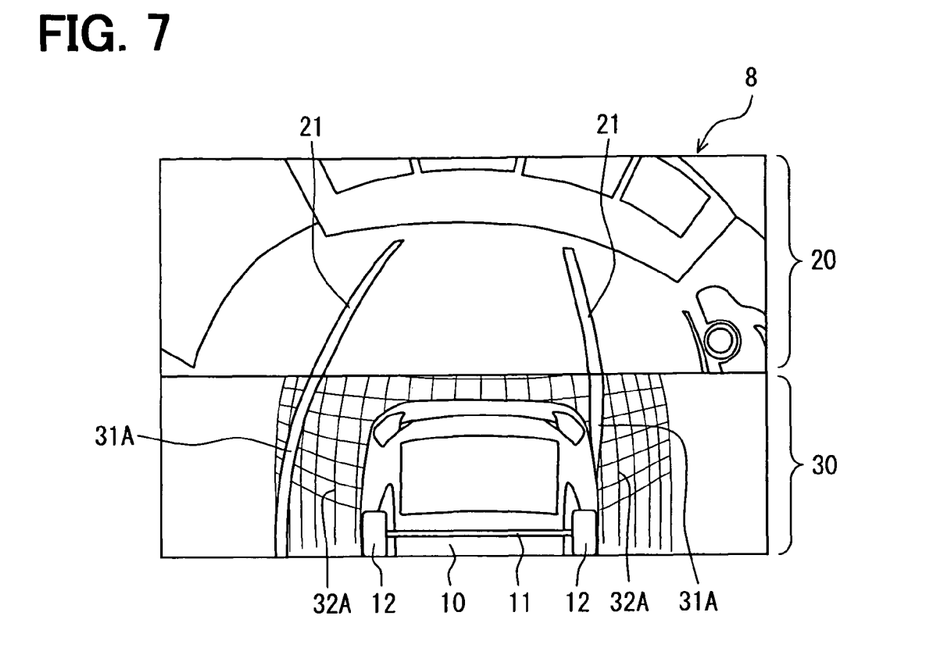
FIG. 7 is a diagram illustrating a corrected white line on a history displaying part of the window.

Further, as shown in FIG. 7, the drawing circuit 4 may perform a correction process on a white line 31A or a scale line 32A, which are to be displayed on the history displaying part 30. In the correction process, the drawing circuit 4 changes a part of the white line 31A or a part of the scale line 32A, which part is located a predetermined distance or more apart from the boundary between the parts 20, 30, into a straight line shape by reducing an influence of distortion on the part. When the above correction process is performed, the white line 31 is displayed such that: a part of the white line 31A at the boundary between two parts 20, 30 is continuously connected to and integrated with the white line 21 of the raw image on the rearward image displaying part 20; and the scale line 32A or the other part of the white line 31A is displayed in the form of approximately un-curved line.

Operation and advantage of the vehicle rear displaying apparatus will be described below.

When receiving a signal indicating that a vehicle moves backward, the vehicle rear displaying apparatus displays a vehicle periphery image. According to an aspect, the vehicle rear displaying apparatus is configured to include: a camera 6; a memory 5; and a display screen 8; and a drawing circuit 4. The camera 6 is configured to capture a rearward image, which shows a rearward of a vehicle (an area behind the vehicle). Data of the rearward image captured by the camera 6 in the past is stored as history data in the memory 5. A vehicle image, which shows a rear part of the vehicle and which is to be drawn to have a precise positional relationship to the captured periphery image, is pre-stored in the memory 5. The display screen has a rearward image displaying part 20 and a history displaying part 30. The rearward image displaying part 20 is for displaying thereon the rearward image that shows a present situation of the rearward of the vehicle. The history displaying part 30 is for displaying thereon a history image produced based on the history data. The drawing circuit 4 is configured to superimposingly draw the vehicle image and the history image each taken from a predetermined viewpoint, wherein the history image contains an image of a white line 31 (which is an example of an on-road, object or a road-surface mark) extracted from the history data. The drawing circuit 4 provides each of the vehicle image and the history image with distortion that the periphery image has. The drawing circuit 4 draws the white line 31 on the history displaying part 30 such that the white line 31 on the history displaying part 30 is continuously connected to a white line 21 in the rearward image on the rearward image displaying part 20.

According to the above vehicle rear displaying apparatus, since the rearward image with the distortion is displayed on the rearward image displaying part 20, the displayed rearward image can have an angle of view of, for example, 180 degrees. It is thus possible to provide the rearward image covering a larger area compared to a rearward image whose distortion is corrected. A driver can obtain much more information on the periphery of the vehicle. Moreover, since the images for the history displacing part 30 are daringly provided with the distortion that the rearward image has, and since the white line 31 produced based on the history data and displayed on the history displaying part 30 is continuously connected to the white line 21 in the rearward image on the rearward image displaying part 20, it is possible to provide visual presentation in which the rearward image (which may be a raw image) showing the present situation is visually integrated with the history image showing an area that is currently located outside the field of view of the camera 6. Therefore, the vehicle rear displaying apparatus can reduce an amount of image processing of a controller, and enable a driver to precisely recognize the position of the vehicle 10, and improve the parking assistance performance.

Moreover, the vehicle rear displaying apparatus sets a detection target to an road-surface-mark such as the white line 21 (e.g., a parking line indicative of a parking space), and displays the detection target so that the detection target continuously extends over the present image (i.e., an image for the rearward image displaying part 20) and the past image (i.e., an image for the history displaying part 30 produced based on the history data). According to the above manners, since the road-surface mark being a non-three-dimensional object is detected using the captured rearward image, it is possible to reduce computation power and computation time required for am image processing device and a detection device, compared to a case of detecting the presence of a three dimensional object. It becomes therefore possible to provide an apparatus at a low cost.

Moreover, the drawing circuit 4 draws an on-road object or a road-surface mark (e.g., white line 31A) such that a part located a predetermined apart from the boarder between the parts 20, 30 is corrected to have a straight line shape.

According to the above manner, the white line 31A or the like is drawn so as to be continuously connected at the boundary between the parts 20 and 30, and the part located distant from the boarder is drawn so as the have a straight line shape, from which the distortion of the image for the history displaying part is removed. Thus, in the vicinity of the vehicle 10 on the history displaying part 30, the displayed white line 31 or the like can be approximately parallel to the vehicle 10. Therefore, it is possible to remove poor-visibility resulting from the distortion of the image on the history displaying part 30, while maintaining continuity at the boundary between the image for the rearward image displaying part 20 and that for the history displaying part 30.

Further, the drawing circuit 4 draws a scale line 32 on the history displaying part 30 to indicate distance from the vehicle. According to this manner, since the white line 31 (which is an example of an on-road object and a road-surface mark) and the scale line 32 are drawn around the vehicle 10 on the history displaying part 30, the vehicle rear displaying apparatus enables a driver to comprehend a positional relationship between the vehicle 10 and the on-road object around the vehicle 10 (e.g., the on-road object, the road-surface mark) in detail.

The drawing circuit 4 may display the images such that the displayed images for the history displaying part 30 are only the vehicle CG and the white line 31 each having the same distortion as the raw image on the rearward image displaying part 20 has.

According to this manner, since the displayed images for the history displaying part 30 are only the vehicle CG and the white line 31, and since another image is not displayed on the history displaying part 30, the vehicle rear displaying apparatus enables a driver to directly and clearly comprehend a positional relationship between the vehicle 10 and a mark (e.g., the white line 31 or the like). Further, since information to be drawn is narrowed down in the above-described way, it is possible to suppress an image processing amount.

The vehicle rear displaying apparatus may be configured such that a background part of the image for the history displaying part 30 is drawn in color that is different from a road surface color of the rearward image on the rearward image displaying part 20. The background part may be a part other than the vehicle CG, the on-road object, the road-surface mark and the scale line. By coloring the background part in the above way, it is possible to make notable the boundary between the image on the rearward image displaying part 20 and the image on the history displaying part 30. Further, although the image on the part 20 and the image on the part 30 are integrated into a synthetic image, a driver can easily recognize that the image on a upper part of the display screen is the raw image showing a present situation and the image on a lower part of the display screen is the past image showing an area currently located outside the field of view of the camera 6. For example, the color of the background part on the history displaying part 30 may be drawn in black, blue or the like so as to differ from an actual color of a road surface and color of the vehicle CG. This example can make it more distinguishable that the two images on the display screen are images on different parts 20, 30. The vehicle CG, the on-road object, the road-surface mark, the scale line and the like can be more distinctively viewable.

The drawing circuit 4 may draw the road-surface mark such as the white line 31 and the like on the history displaying part 30, such that color of the road-surface mark on the history displaying part 30 becomes similar to that of the road-surface mark on the rearward image displaying part 20. According to this manner, the road-surface mark can be continuously and integrally displayed so as to extend over the rearward image displaying part 20 and the history displaying part 30 in a reliable manner.

The drawing circuit 4 may draw the road-surface mark such as the white line 31 and the like on the history displaying part 30 so that the road-surface mark constantly has a predetermined color depth, even if the road-surface mark extracted from the history data is an unclear or indefinite line. According to this manner, even if a part of the road-surface mark cannot be imaged because the road-surface has an a worn-color part, a missing part or the like, the road-surface mark can be reliably displayed so as to continuously and integrally extend over the rearward image displaying part 20 and the history displaying part 30.

The drawing circuit 4 may be controlled by a controller that controls operation of an instrumental panel. In this case, the controller that controls the drawing circuit 4 may have a relatively small memory size and a relatively small computation power. The advantage of reducing an amount of image processing and memory size according to the present embodiment can be more notable.

The display screen 8 may be arranged on a part of the instrument panel. According to this configuration, since the vehicle rear image can be arranged over an indicator of the vehicle, a driver can confirm the vehicle rear image in a similar sense of viewing the indicator, without largely moving his or her directions of eyes.

A large area image and a small area image may be displayed on the display screen 8 based on the large area image captured by a single camera 6. According to this configuration, since it is possible to display the large area image and the small area image through extracting the small area image from the large area image captured by the single camera, it is possible to reduce the number of parts of a system and cost of the system.

The drawing circuit 4 may be controlled by a controller that controls operation of the instrumental panel, and the display screen 8 may be mounted above a dashboard in a vehicle compartment. According to this configuration, since the vehicle rear image is approximately displayed at the same height as an eye-height of a driver, the driver can confirm the vehicle rear image without largely moving his or her direction of eyes.

The vehicle image to be displayed on the history displaying part 30 may contains information on position of an axel 11 of the vehicle 10 and the tire wheel 12. According to this display, since the position of the axel 11 and the tire wheel 12 is displayed, it is possible to inform a driver of the axel position and the tire position relative to a situation of the vehicle periphery. It is possible to provide an image that can be a guideline for driving.

Second Embodiment

Figure 8:
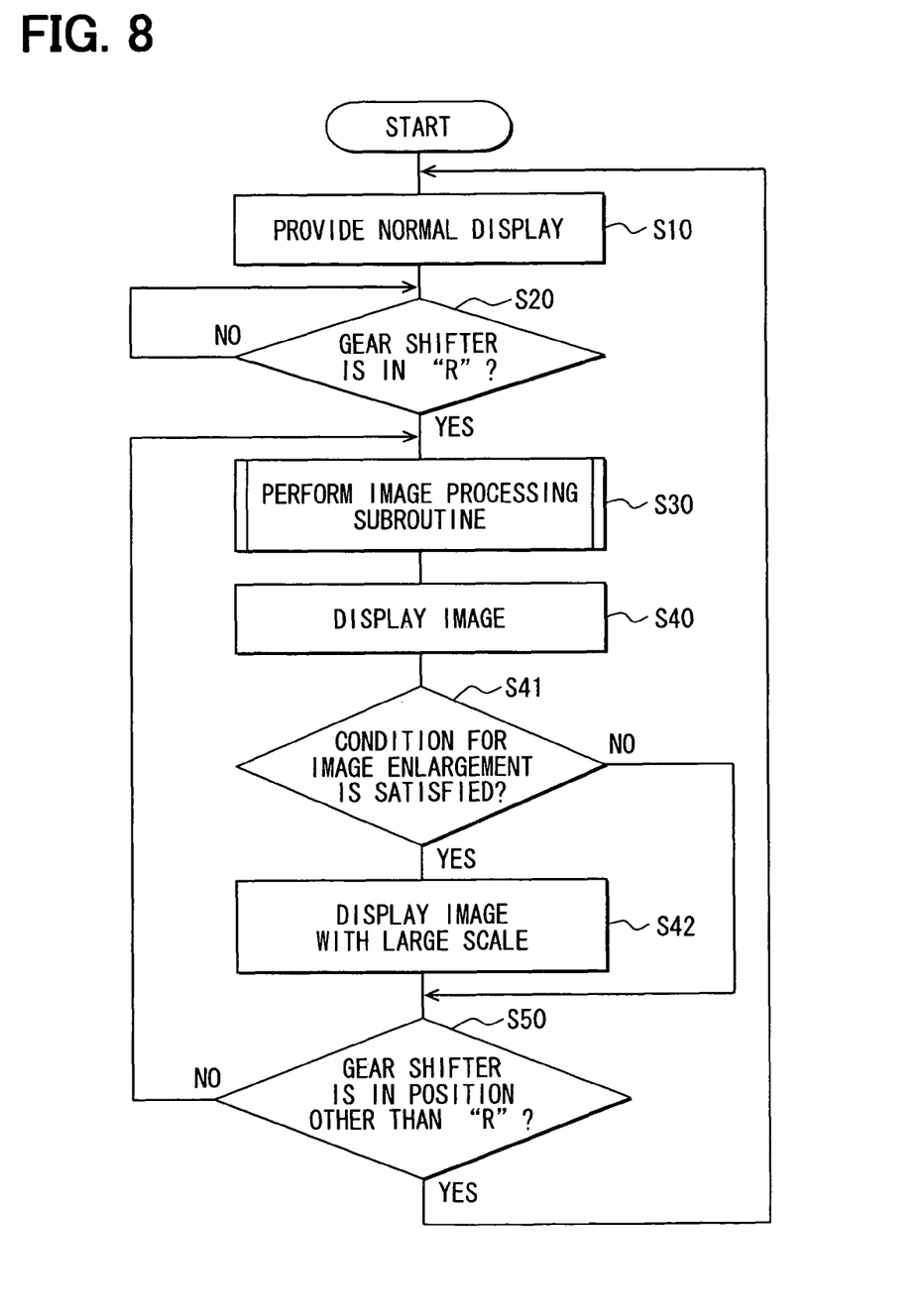
FIG. 8 is a main flowchart illustrating a drive assist operation of a vehicle rear displaying apparatus in accordance with a second embodiment.
Figure 9:
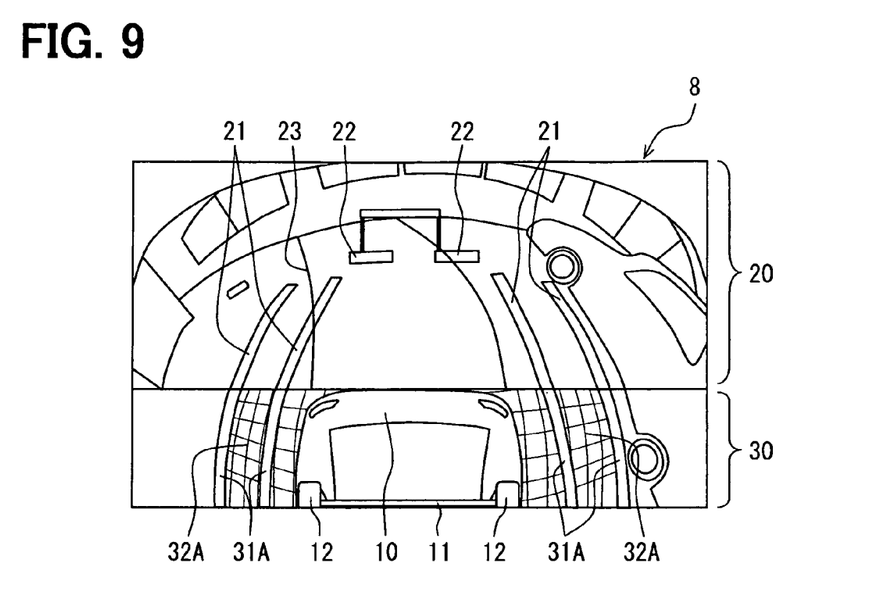
FIG. 9 is a diagram illustrating a window that is displayed when the gear shifter is in the reverse position in accordance with the second embodiment.
Figure 10:
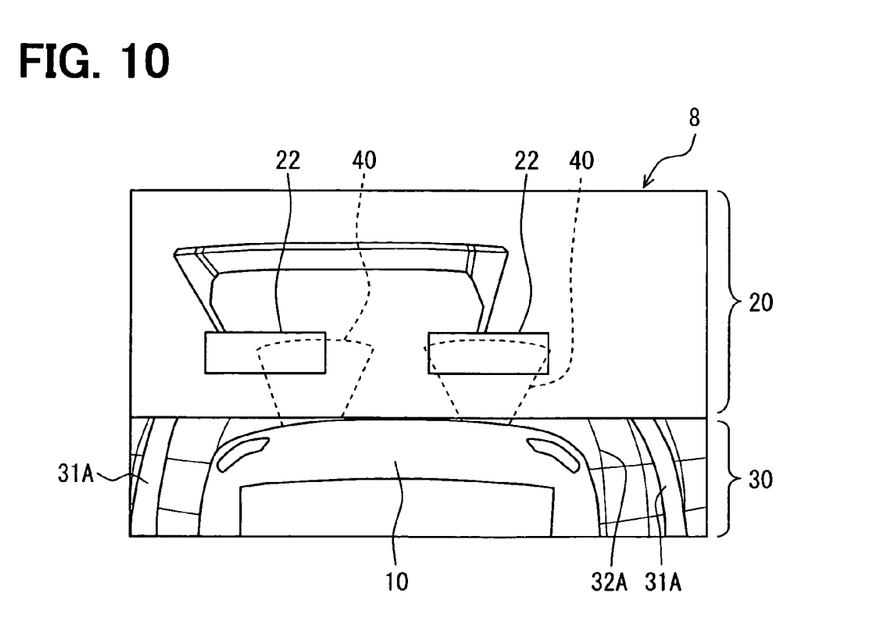
FIG. 10 is a diagram illustrating a zoomed image that is displayed when a predetermined condition is satisfied.

In a second embodiment, the image displayed on the display screen 8 during vehicle parking is switched between a large area image and a small area image in the course of the movement of the vehicle. The large area image covers a large area behind the vehicle 10 with an angle of view of, for example, 180 degrees. The small area image covers a small rear behind the vehicle 10 with an angle of view of, for example, 120 degrees. Thus, in the second embodiment, the image displayed on the display screen 8 during parking may not be always the large area image. FIG. 8 is a main flowchart illustrating a drive assist operation in accordance with the second embodiment. FIG. 9 is a diagram illustrating a large area image in accordance with the second embodiment. FIG. 10 is a diagram illustrating a zoomed image (i.e., a small area image) in accordance with the second embodiment. The large area image and the zoomed image may be displayed when a vehicle moves to park.

S10 to S40 in the main flow chart shown in FIG. 8 are the same as those in FIG. 3. As shown in FIG. 8, at S40, the microcomputer 1 respectively displays the large area images on the rearward image displaying part 20 and the history displaying part 30, as described in the first embodiment. In the present embodiment, as shown in FIG. 9, the drawing circuit 4 draws an expected travel path line 23 so that the expected travel path line 23 is superimposed on the image for the rearward image displaying part 20. The expected travel path line 23 can act as a guideline that predicts an expected travel path of a backing vehicle based on the vehicle width and the steering angle of the vehicle. The expected travel path line 23 is drawn in color that differs from road surface color of the image, and is easily distinguishable for a driver.

At S41, the microcomputer 1 determines whether a predetermined condition for display image zooming is satisfied. The predetermined condition for display image zooming determines timing of switching display from the large area image into the small area image during backward movement of the vehicle.

Explanation on the predetermined condition for display image zooming is more specifically given below. When a gear shifter is changed into a reverse position to park a vehicle, and when a vehicle moves backward, the vehicle approaches an obstacle such as a wheel stopper 22, a curb, a barrier, a wall and the like located in the vicinity of a parking space. In the present embodiment, when a distance between the vehicle and the obstacle is less than or equal to a predetermined distance, it is determined that the predetermined condition for display image zooming is satisfied. To make the above determination, the vehicle is equipped with sonar. The sonar can act as detection means or detection device for detecting a distance from the vehicle to a three-dimensional object or the like located in the periphery of the vehicle. The sonar may include multiple ultrasonic sensors. The sonar inputs a signal indicative of the detected distance to the microcomputer 1. The predetermined number of ultrasonic sensors may be mounted to an outer surface of the rear part of the vehicle at predetermined intervals. For example, each ultrasonic sensor may be embedded in the rear bumper with a detection part of the ultrasonic sensor being exposed from the rear bumper. A detection range 40 of the sonar covers a predetermined area in the periphery of the vehicle, as shown by a dashed-line in FIG. 10. It should be noted that the dashed line defining the detection range 40 is drawn in FIG. 10 merely for descriptive purpose, and may be not actually displayed on the display screen 8.

When it is determined that the distance to the obstacle detected by the sonar is less than or equal to the predetermined distance, corresponding to "YES" at S42, the microcomputer 1 determines that the vehicle approaches the parking space, and the process proceeds to S42. At S42, the microcomputer 1 switches display from the large area image into the small area image via the drawing circuit 4. For example, the microcomputer 1 switches display from the large area image illustrated in FIG. 9 into the small area image illustrated in FIG. 10. In the switching into the small area image, the drawing circuit 4 does not draw the expected travel path line 23. Thus, the small area image without having the expected travel path line 23 is displayed on the rearward image displaying area 20 of the display screen 8. In the present embodiment, the drawing circuit 4 cuts out a part of the image captured by the camera 6, and zooms the cut out part, thereby producing the small area image, i.e., the zoomed image, as shown in FIG. 10.

When it is determined that the predetermined condition for display image zooming is not satisfied, corresponding to "NO" at S41, the process proceeds to S50 to maintain the display illustrated in, for example, FIG. 9. When it is determined that the predetermined condition for display image enlargement is satisfied, corresponding to "YES" at S41, the process proceeds to S42 to perform a process of providing the zoomed display illustrated in, for example, FIG. 10. Then, when the determination at S50 results in "YES", the process returns to S10 to finish displaying the vehicle rear image. When the ignition switch is turned into OFF after completion of parking for example, the power supply to the controller is stopped and the drive assist operation of the main flow chart is ended.

Operation and advantage of the vehicle rear displaying apparatus of the present embodiment can be described as follows.

The drawing circuit 4 of the vehicle rear displaying apparatus draws the expected travel path line 23 by superimposing it on the rearward image on the rearward image displaying part 20. When the predetermined condition is satisfied during backward movement of the vehicle, the images on the rearward image displaying part 20 and the history displaying part 30 are zoomed, and the drawing circuit 4 prohibits the expected travel path line 23 from being displayed.

According to the above manners, when it is required to confirm a detailed image of the rearward of the vehicle during backward movement of the vehicle, the zoomed image is displayed on the display screen while the expected travel path line is not being displayed. For example, after the last half of parking movement, since movement of the vehicle may become small, the need for displaying the expected travel path line 23 may become smaller and the need for comprehending a situation of the rearward of the vehicle in detail may become larger than that for confirming the expected travel path line 23. Therefore, the above manners can provide visual presentation that does not spoil the visibility of the rearward of the vehicle, while providing a driver to detained information on the rearward of the vehicle. Therefore, it is possible to provide more useful parking assistance.

(Modifications)

The above embodiments can be modified in various ways, examples of which are described below.

In the above embodiment, the vehicle rear displaying apparatus is illustrated as an example of a vehicle periphery displaying apparatus. Regarding an image on the display screen, a vehicle periphery displaying apparatus may display (i) an image showing the present situation of a periphery of a vehicle on a periphery image displaying part of the display screen and (ii) an image showing an area currently located outside of the filed of view of the camera on a history displaying part of the display screen. For example, a front of the vehicle (i.e., an area in front of the vehicle) may be displayed as the periphery of the vehicle.

In the above embodiment, the white line (e.g., a parking line) is illustrated as an example of a mark that is extracted and drawn on an image on the history displaying part 30. Alternatively, another road-surface mark and an on-road object such as a ditch, a step, a curb and the like may be extracted. A method similar to the above-described white line detection method may be used as a method for road-surface mark detection and on-road object detection.

In the above embodiment, a single camera 6 captures an image to be displayed on the display screen 8. Alternatively, multiple cameras may respectively capture images that are displayed on the display screen 8 displays as a combined image.

In the second embodiment, the captured image showing a rearward of the vehicle is an image captured by a single camera 6. Alternatively, the vehicle rear displaying apparatus may include a first camera for capturing the large area image with a field of view of, for example, 180 degrees and a second camera for capturing the small area image with a field of view of, for example, 120 degrees, and may use the large area image and the small area image as an image to be displayed on the display screen. According to this configuration, since the first and second cameras respectively capture the large area image and the small area image, it is possible to reduce computation such as an amount of image processing, computation time, and size of a memory for storing images.

In the second embodiment, the predetermined condition for display image zooming is set based on a distance between a vehicle and an obstacle. Alternatively, the predetermined condition for display image zooming may be set based on a backward displacement of a vehicle.

In the above embodiments and modifications, the vehicle rear displaying apparatus is an example of a vehicle periphery displaying apparatus. The microcomputer 1 is an example of a controller. The drawing circuit 4 is an example of a drawing section or means. The memory 5 is an example of a storage medium. The camera 6 is an example of an imaging device or means. The rearward image displaying part 20 of the display screen 8 is an example of a periphery image displaying part or a real-time displaying part. The road surface mark and the on-road object, e.g., a white line 21, 31, are an example of an object-in-periphery.

According to an aspect of the present invention, a vehicle periphery displaying apparatus for a vehicle is provided. The vehicle periphery apparatus includes an imaging device, a storage medium, a display screen and a drawing section. The imaging device is configured to capture a periphery image, which shows a periphery of the vehicle and an object-in-periphery located in the periphery of the vehicle. The object-in-periphery includes at least one of an road-surface mark and an on-road object. The storage medium is configured to store history data comprising at least one of the periphery image and information on the object-in-periphery. The information on the object-in-periphery is extracted from the periphery image or acquired from a sensor equipped in the vehicle. A vehicle image representative of the vehicle is pre-stored in the storage medium. The display screen has: a real-time displaying part for displaying thereon the periphery image that shows a present situation of the periphery of the vehicle, with distortion of the periphery image being uncorrected; and a history displaying part for displaying thereon the vehicle image and a history image, the history image being produced based on the history data. The history displaying part adjoins the real-time displaying part. The drawing section is configured to superimposingly draw the vehicle image and the history image each taken from a predetermined view point on the history displaying part of the display screen, such that: the vehicle image and the history image are provided with the distortion that the periphery image has; and the object-in-periphery shown in the history image is continuously connected to that shown in the periphery image.

According to the above vehicle periphery displaying apparatus, since the periphery image with the uncorrected distortion is displayed on the real-time displaying part, an area covered by the periphery image becomes larger than that covered by an image whose distortion is corrected. It is therefore possible to provide a driver to much more information on the periphery of the vehicle. Further, since the object-in-periphery displayed on the history displaying part is provided with the distortion that the periphery image has, and since the object-in-periphery displayed on the history displaying part is continuously connected to that shown in the real-time displaying part, it is possible to provide visual presentation by visually combining (i) the periphery image on the real-time displaying part (e.g., a raw image) showing the present situation of the periphery and (ii) the history image on the history displaying part showing an area presently located outside of a field of view of the imaging device. It is therefore possible to ensure visibility of the periphery of the vehicle and reduce computation for image production. In the above, the object-in-periphery may be a mark or object in the periphery of the vehicle, such as a ditch, a step, curb, a pedestrian, another vehicle, a parking line (e.g., white line indicating a parking space) or the like.

The above vehicle periphery displaying apparatus may be configured such that: the drawing section is configured to draw the object-in-periphery on the history displaying part such that a part of the object-in-periphery on the history displaying part is corrected to have a straight line shape, the part being located a predetermined distance or more apart from a boarder between the real-time displaying part and the history displaying part. According to this configuration, a part of the object-in-periphery on the history displaying apparatus can be drawn in parallel to the vehicle when the part is located in the vicinity of the vehicle. It is therefore reduce poor-visibility resulting from distortion caused by a lens of the imaging device.

The above vehicle periphery displaying apparatus may be configured such that the drawing section is configured to further draw a scale line on the history displaying part to indicate distance from the vehicle. According to this configuration, the history displaying part of the display screen can display thereon the object-in-periphery and the scale line at an area around the vehicle. It is therefore possible to enable a driver to precisely recognize position of the vehicle with respect to, for example, a parking space.

The above vehicle periphery displaying apparatus may be configured such that: the vehicle image pre-stored in the storage medium is a computer graphic image, which is created as computer graphic; the history image represents only the object-in-periphery extracted from the history data; and on the history displaying part, the drawing section draws only the vehicle image and the on-board object image, with the vehicle image and the object-in-periphery image having the distortion that the captured periphery image has.

According to this configuration, the history displaying part of the display screen can display thereon only the vehicle image (which may be created as computer graphic) and the in-vehicle periphery object image, without displaying other information. It is therefore possible to enable a driver to clearly comprehend a positional relationship between the vehicle and the object-in-periphery. Further since information to be displayed is narrowed down in the above-described way, it is possible to reduce an amount of image processing, and thereby reducing computation power required for image production.

The above vehicle periphery displaying apparatus may be configured such that: the drawing section is configured to draw the road-surface mark on the history displaying part such that color of the road-surface mark on the history displaying part is, substantially identical to that on the real-time, displaying part. According to this configuration, the object-in-periphery can be continuously and integrally displayed so as to extend over the real-time displaying part and the history displaying part. It is therefore possible to provide high visibility to a driver.

The above vehicle periphery displaying apparatus may be configured such that: even if the road-surface mark extracted from the history data is indefinite, the drawing section draws the road-surface mark on the history displaying part so that the displayed road-surface mark has a constant color depth. According to this configuration, even if a part of the road-surface mark is un-imaged because the road-surface mark has an a worn-color part, a missing part or the like, the road-surface mark can be reliably displayed as a mark that continuously and integrally extends over the real-time displaying part and the history displaying part. It is therefore possible to provide parking assistance to a driver even if a condition of the road-surface object is poor.

The above vehicle periphery displaying apparatus may be configured such that: the drawing section is configured to superimpose an expected travel path line on the periphery image on the real-time displaying part, the expected travel path line being representative of an expected travel path of the vehicle; when a predetermined condition is satisfied during movement of the vehicle, the drawing section zooms the periphery image, the history image and the vehicle image, and prohibits the expected travel path line from being displayed. According to this configuration, when the predetermined condition for image zooming is satisfied during movement of the vehicle, the zoomed images are displayed and the expected travel path line is not displayed. For example, after the last half of parking movement, since movement of the vehicle may become small, the need for displaying the expected travel path line may become smaller and the need for comprehending a situation of the rearward of the vehicle in detail may become larger than that for confirming the expected travel path line. Therefore, while providing a driver to detained information, the above configuration can provide visual presentation that does not spoil visibility.

The above vehicle periphery displaying apparatus may be configured such that: the drawing section further draws at least one of an axel of the vehicle and a tire wheel of the vehicle on the history displaying part. According to this configuration, it is possible to inform a driver of position of the axel or position of the tire wheel, and thereby it is possible to improve performance of driving operation assistance.

The above vehicle periphery displaying apparatus may be configured such that: the vehicle is further equipped with a controller of an instrumental panel of the vehicle; and the drawing section is controlled by the controller. According to this configuration, the controller that controls the drawing section is the controller of the instrument panel whose typical computation power and memory size is not relatively large. It is therefore possible to more remarkably show up an advantage of reducing required computation power and memory size in providing the visual presentation, in which the periphery image (which may be a raw image showing a present circumstance) on the vehicle periphery displaying part is visually connected with the history image and the vehicle image (on the history displaying part) each showing an area that is currently, outside of the present field of view of the imaging device.

The above vehicle periphery displaying apparatus may be configured such that: the display screen is arranged on a part of the instrument panel. According to this configuration, since a vehicle periphery image can be arranged over an indicator of the vehicle, a driver can confirm the vehicle rear image in a similar sense of viewing the indicator, without largely moving his or her line of sight.

The above vehicle periphery displaying apparatus may be configured such that: the imaging device images an area behind the vehicle to capture the periphery image; and the periphery image showing the present situation of the area behind the vehicle is displayed on the real-time displaying part with the distortion of the periphery image being uncorrected. According to this configuration, since the periphery image with the distortion is displayed on the real-time displaying part of the display screen, the displayed periphery image with the distortion can cover an area larger than a periphery image on which distortion correction has been made. It is therefore possible to provide a driver with much information on the periphery of the vehicle. Further, since the history image are provided with the distortion that periphery image has, and since the history image is displayed on the real-time displaying part so that the on-road object shown in the history image is continuously connected to that shown in the periphery image, the vehicle periphery displaying apparatus can provide the visual presentation, in which the periphery image (which may be a raw image showing a present circumstance) on the real-time displaying part is visually connected with the history image and the vehicle image (on the history displaying part) each showing an area that is located outside the present field of view of the imaging device. Therefore, the vehicle periphery displaying apparatus enables a driver to precisely recognize position of the vehicle. Accordingly, it is possible to ensure visibility of the periphery of the vehicle and reduce an amount of the image processing for vehicle periphery image production. In the above, the periphery image on the real-time displaying part covers an area in the periphery of the vehicle, the area being presently located inside a filed of view of the imaging device. The history image on the history displaying part covers another area in the periphery of the vehicle, the another area being presently located outside a filed of view of the imaging device.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of procedures, processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a computer program product stored in a computer-readable storage medium.

What is claimed is:

1. A vehicle periphery displaying apparatus for a vehicle, comprising:

an imaging device that is configured to capture a periphery image, wherein the periphery image shows a periphery of the vehicle and an object-in-periphery, wherein the object-in-periphery is located in the periphery of the vehicle, wherein the object-in-periphery includes at least one of an road-surface mark and an on-road object;

a storage unit that is configured to store history data comprising at least one of the periphery image and information on the object-in-periphery, wherein the information on the object-in-periphery is extracted from the periphery image or acquired from a sensor equipped in the vehicle, wherein a vehicle image representative of the vehicle is pre-stored in the storage unit;

a display screen that has
  a real-time displaying part for displaying thereon the periphery image presently captured by the imaging device without correcting distortion of the presently-captured periphery image, wherein the displayed periphery image shows a present situation of the periphery of the vehicle, and
a history displaying part for displaying thereon the vehicle image from the storage unit and a history image from the storage unit, wherein the history image is produced based on the history data and shows the periphery of the vehicle presently outside a field of view of the imaging device, wherein the history displaying part adjoins the real-time displaying part; and a drawing section that is configured to super imposingly draw the vehicle image and the history image each taken from a predetermined view point on the history displaying part of the display screen, such that:

the vehicle image and the history image displayed on the history displaying part have the distortion that the periphery image displayed on the real-time displaying part has; and the object-in-periphery displayed on the history displaying part is continuously connected to the object in-periphery shown displayed on the real-time displaying part; wherein the history image displayed on the history displaying part was taken at a time prior to the periphery image presently captured by the imaging device and displayed on the real-time displaying part.

2. The vehicle periphery displaying apparatus according to claim 1, wherein:

the drawing section is configured to draw the object-in-periphery on the history displaying part such that a part of the object-in-periphery on the history displaying part is corrected to have a straight line shape, the part being located a predetermined distance or more apart from a border between the real-time displaying part and the history displaying part.

3. The vehicle periphery displaying apparatus according to claim 1, wherein: the drawing section is configured to further draw a scale line on the history displaying part to indicate distance from the vehicle.

4. The vehicle periphery displaying apparatus according to claim 1, wherein:

the vehicle image pre-stored in the storage unit is a computer graphic image, which is created as computer graphic;

the history image represents only the object-in-periphery extracted from the history data; and on the history displaying part, the drawing section draws only the vehicle image and the extracted object-in-periphery, such that the vehicle image and the object-in-periphery on the history displaying part have the same distortion as the captured periphery image on the real-time displaying part has.

5. The vehicle periphery displaying apparatus according to claim 1, wherein:

the drawing section is configured to draw the road-surface mark on the history displaying part such that color of the road-surface mark on the history displaying part is substantially identical to that on the real-time displaying part.

6. The vehicle periphery displaying apparatus according to claim 1, wherein:

even if the road-surface mark extracted from the history data is indefinite, the drawing section draws the road-surface mark on the history displaying part so that the displayed road-surface mark has a constant color depth.

7. The vehicle periphery displaying apparatus according to claim 1, wherein:

the drawing section is configured to superimpose an expected travel path line on the periphery image on the real-time displaying part, the expected travel path line being representative of an expected travel path of the vehicle; and when a predetermined condition is satisfied during movement of the vehicle, the drawing section zooms the periphery image, the history image and the vehicle image, and prohibits the expected travel path line from being displayed.

8. The vehicle periphery displaying apparatus according to claim 1, wherein:

the drawing section further draws at least one of an axel of the vehicle and a tire wheel of the vehicle on the history displaying part.

9. The vehicle periphery displaying apparatus according to claim 1, wherein:

the vehicle is further equipped with a controller of an instrumental panel of the vehicle; and the drawing section is controlled by the controller.

10. The vehicle periphery displaying apparatus according to claim 9, wherein: the display screen is arranged on a part of the instrument panel.

11. The vehicle periphery displaying apparatus according to claim 1, wherein: the imaging device images an area behind the vehicle to capture the periphery image; and the periphery image showing the present situation of the area behind the vehicle is displayed on the real-time displaying part with the distortion of the periphery image being uncorrected.

12. The vehicle periphery displaying apparatus according to claim 1, wherein the periphery of the vehicle is the immediate periphery of the vehicle.

13. The vehicle periphery displaying apparatus according to claim 12, wherein the vehicle image is representative of an external shape of the vehicle.

14. The vehicle periphery displaying apparatus according to claim 1, wherein the vehicle image is representative of an external shape of the vehicle.

15. The vehicle periphery displaying apparatus according to claim 1, wherein the history displaying part of the display screen is separate from the real time displaying part of the display screen.

16. The vehicle periphery displaying apparatus according to claim 15, wherein the periphery of the vehicle is the immediate periphery of the vehicle.

17. The vehicle periphery displaying apparatus according to claim 15, wherein the vehicle image is representative of an external' shape of the vehicle.

18. The vehicle periphery displaying apparatus according to claim 1, wherein the present situation of the periphery of the vehicle, the vehicle image and the history image are simultaneously displayed on the display screen.

19. The vehicle periphery displaying apparatus according to claim 18, wherein the periphery of the vehicle is the immediate periphery of the vehicle.

20. The vehicle periphery displaying apparatus according to claim 18, wherein the vehicle image is representative of an external' shape of the vehicle.

21. The vehicle periphery displaying apparatus according to claim 1, wherein the history image displayed on the history displaying part was taken at a time prior to the periphery image presently captured by the imaging device and displayed on the real-time displaying part.

* * * * *

UNITED STATES PATENT AND TRADEMARK OFFICE
CERTIFICATE OF CORRECTION

| | | |
|---|---|---|
| PATENT NO. | : 8,441,536 B2 | Page 1 of 1 |
| APPLICATION NO. | : 12/658559 | |
| DATED | : May 14, 2013 | |
| INVENTOR(S) | : Imanishi et al. | |

It is certified that error appears in the above-identified patent and that said Letters Patent is hereby corrected as shown below:

On the Title Page, item [73] should read:
        DENSO CORPORATION, Kariya (JP)
        Nippon Soken, Inc., Nishio (JP)

Signed and Sealed this
Twenty-fifth Day of March, 2014

Michelle K. Lee
*Deputy Director of the United States Patent and Trademark Office*